United States Patent [19]
Lemke et al.

[11] Patent Number: 5,488,521
[45] Date of Patent: Jan. 30, 1996

[54] INFORMATION RECORDING APPARATUS WITH A NON-NEWTONIAN LIQUID BEARING

[75] Inventors: James U. Lemke, San Diegeo; William W. French, Encinitas, both of Calif.

[73] Assignee: Conner Peripherals, Inc., San Jose, Calif.

[21] Appl. No.: 207,799

[22] Filed: Mar. 7, 1994

Related U.S. Application Data

[63] Continuation of Ser. No. 123,704, Sep. 17, 1993, abandoned, which is a continuation of Ser. No. 966,579, Oct. 26, 1992, abandoned, which is a continuation of Ser. No. 810,955, Dec. 19, 1991, abandoned, which is a continuation of Ser. No. 453,312, Dec. 20, 1989, Pat. No. 5,097,368, which is a continuation-in-part of Ser. No. 259,344, Oct. 17, 1988, abandoned.

[51] Int. Cl.$^6$ .................................................. G11B 33/14
[52] U.S. Cl. .................................................. 360/97.02
[58] Field of Search ............................ 360/97.02, 97.01

[56] References Cited

U.S. PATENT DOCUMENTS 4,626,941  12/1986  Sawada et al. ................... 360/97.02
5,097,368  3/1992  Lemke et al. ..................... 360/97.02

*Primary Examiner*—John H. Wolff
*Attorney, Agent, or Firm*—Fliesler, Dubb, Meyer & Lovejoy

[57] ABSTRACT

An information storage apparatus is disclosed for reading and/or writing information on a rigid disk, which includes a non-Newtonian liquid bearing interface between a transducer and a storage medium, instead of a conventional air or Newtonian liquid bearing. The non-Newtonian liquid has a composition which exhibits plastic or pseudoplastic flow at high rates of shear. Preferably, the liquid is of the class of compounds whose viscosity shows a negative dependence on share rate. Thus, as the relative speed of the transducer and the storage medium increases, while their relative spacing decreases, the increasing shear rate to which the liquid bearing is subjected causes the viscosity of the liquid to reduce. Resultantly, very low flying heights can be achieved, which increases the potential storage density on the storage medium, while the reduced drag exerted on the transducer by the lowered viscosity greatly reduces the power required to rotate the medium.

20 Claims, 8 Drawing Sheets

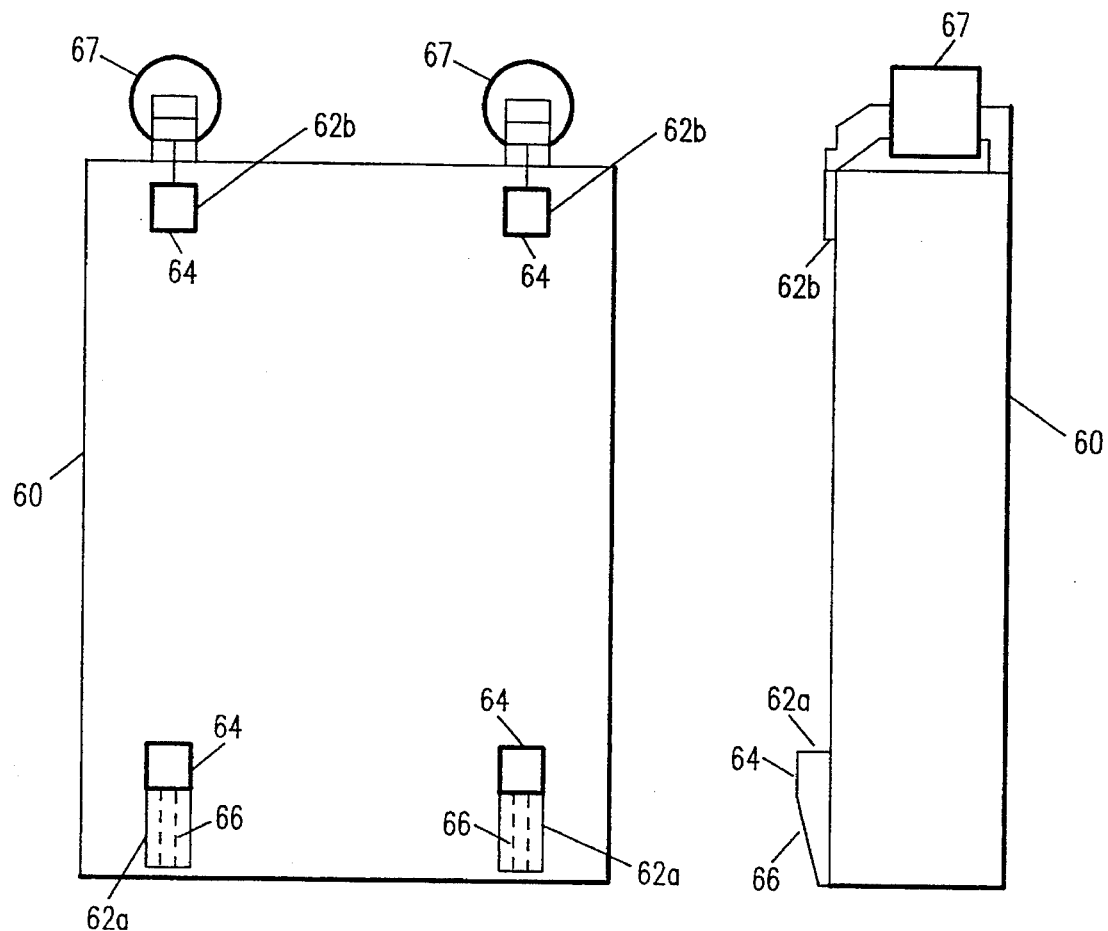
FIG. 5B
FIG. 5C
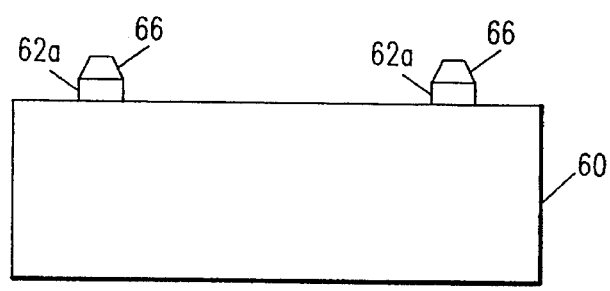
FIG. 5A

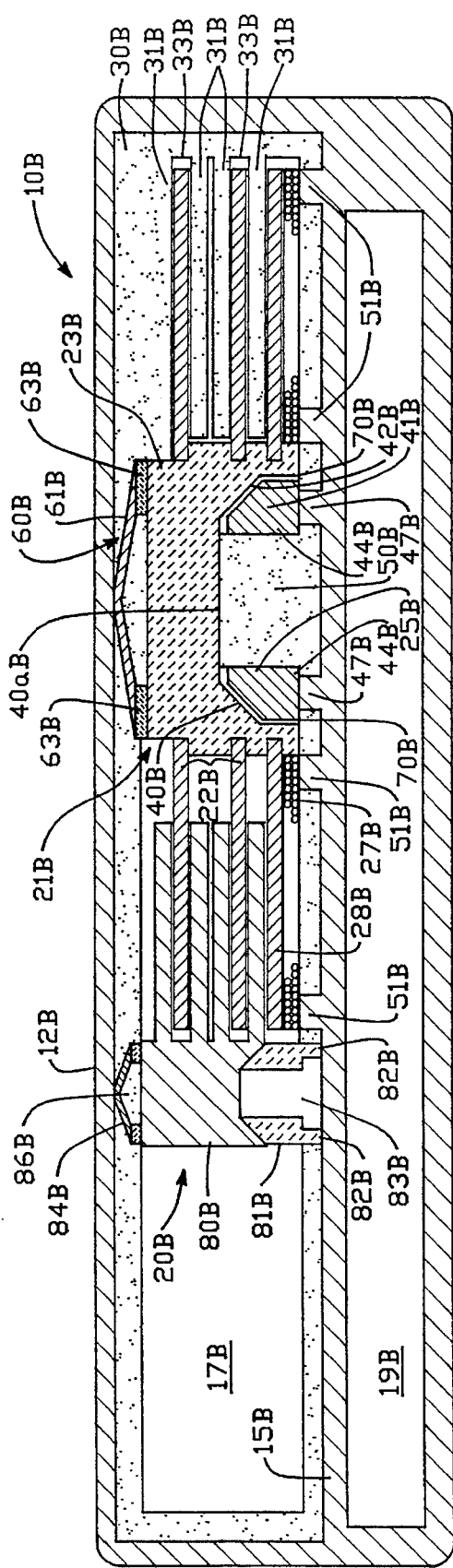
FIG.—9
FIG.—10
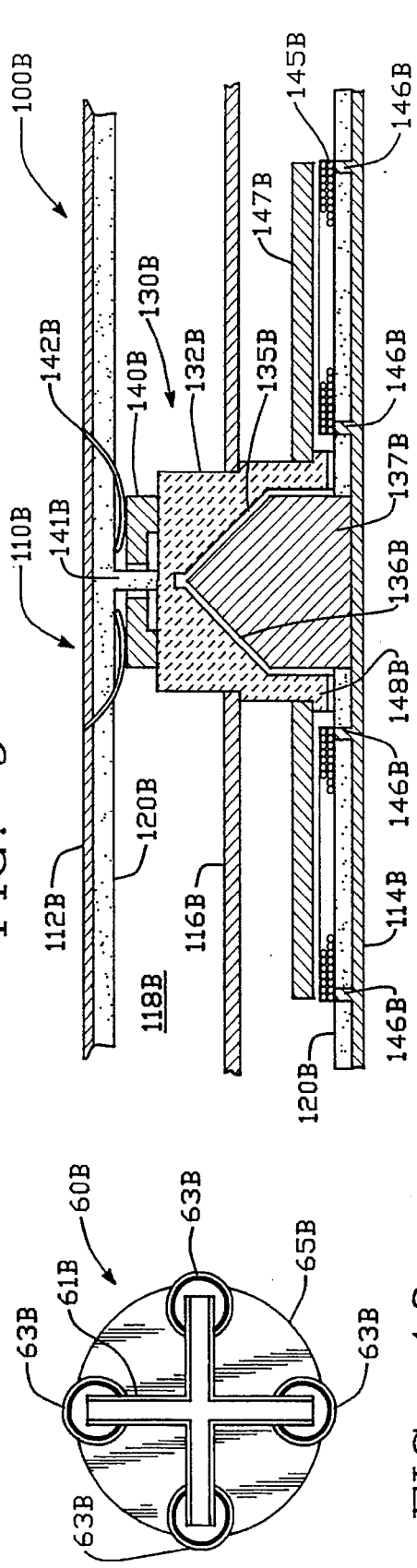
FIG.—11

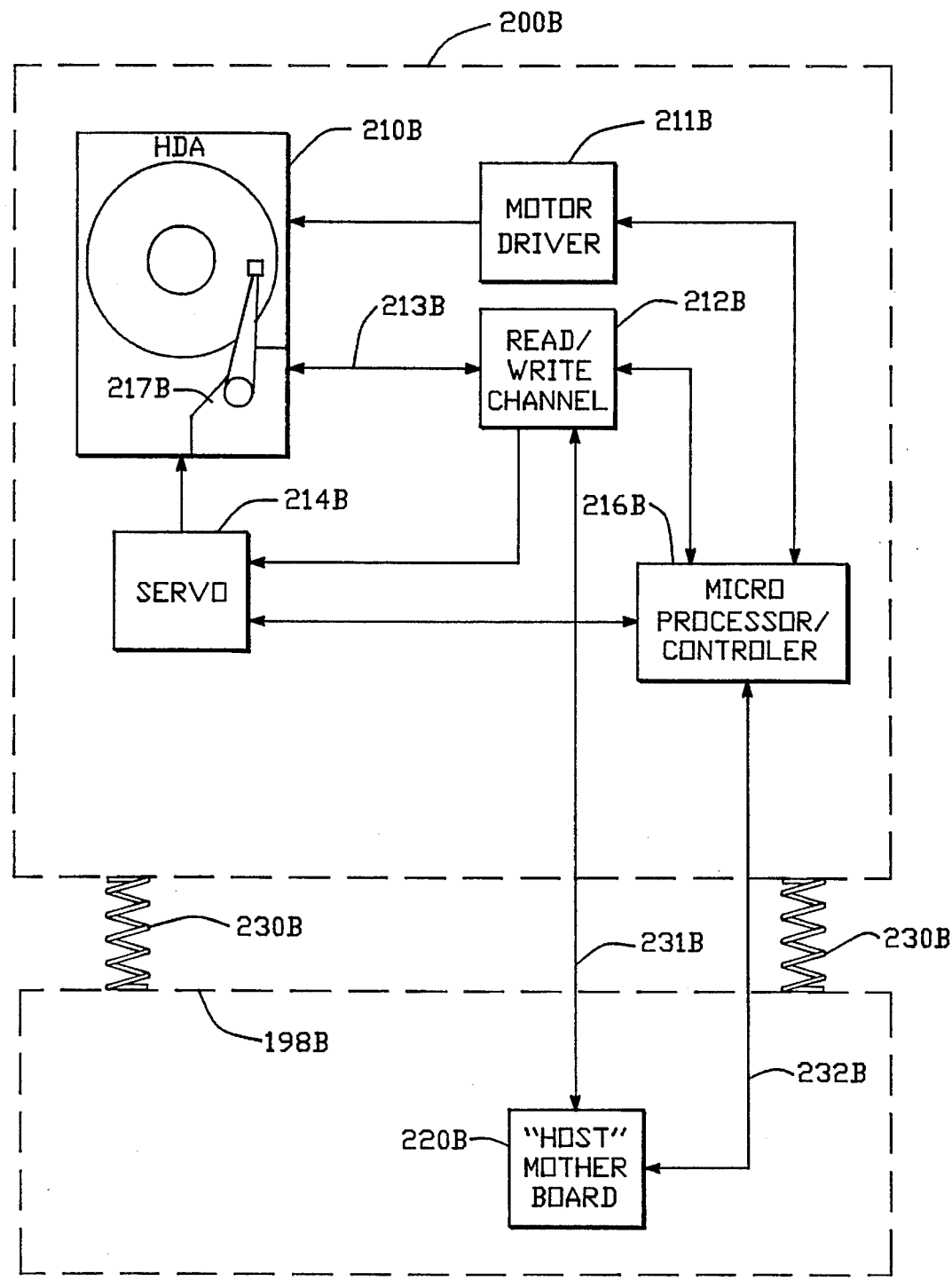
FIG.—12A

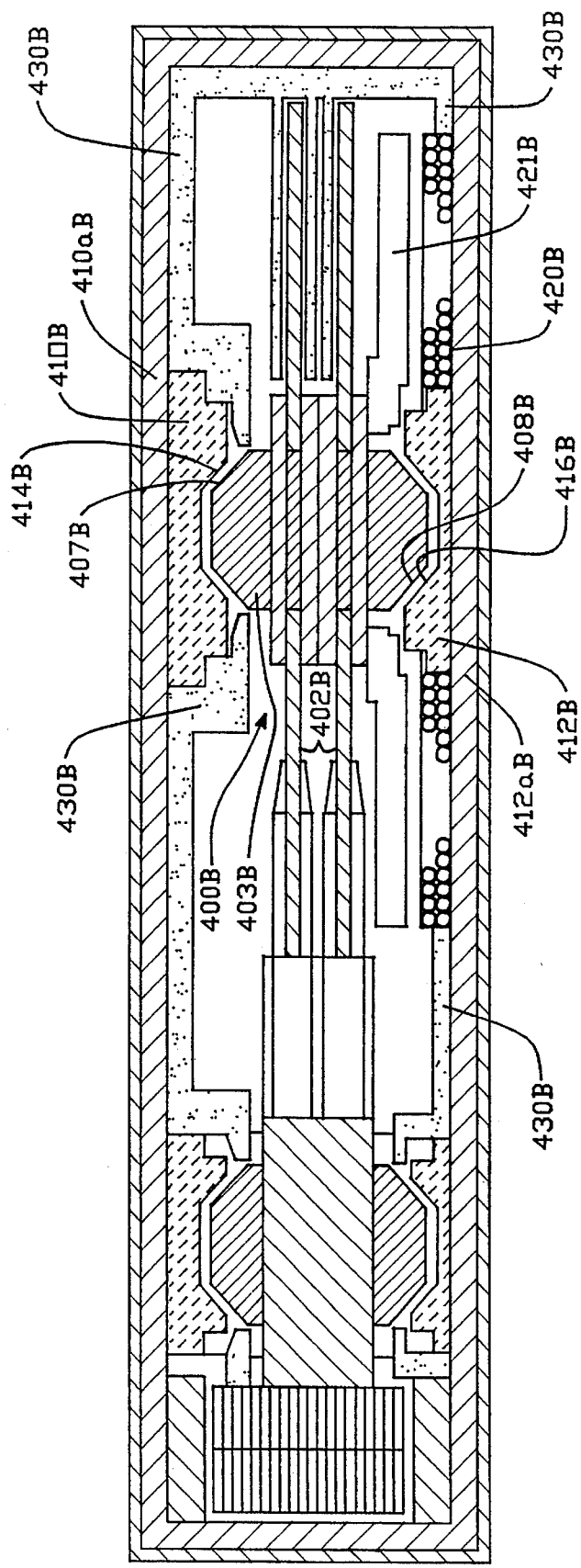
FIG.—13

INFORMATION RECORDING APPARATUS WITH A NON-NEWTONIAN LIQUID BEARING

RELATED PATENT APPLICATIONS

This application is a continuation of Ser. No. 08/123,704, filed Sep. 17, 1993, now abandoned, which is a Continuation of Ser. No. 07/966,579, filed Oct. 26, 1992, now abandoned, which is a Continuation of Ser. No. 07/810,955, filed Dec. 19, 1991, now abandoned, which is a Continuation of Ser. No. 07/453,312, filed Dec. 20, 1989, now U.S. Pat. No. 5,097,368, which is a Continuation-in-Part of U.S. patent application Ser. No. 259,344, filed Oct. 17, 1988, now abandoned.

The following co-pending patent application includes subject matter relevant to this application:

U.S. patent application Ser. No. 07/314,999, filed Feb. 24, 1989, for "Wet Rigid Disk Drive Assembly with a Conical Spindle Bearing", now abandoned.

BACKGROUND OF THE INVENTION

1. Field of the Invention

The invention relates to information recording systems. More specifically, the present invention relates to a recording system having a novel liquid bearing interface between a transducer and a storage medium that provides improved reliability and performance over the currently-used air bearing. The invention applies particularly to information recording systems which use a disk for information storage and an air- or oil-borne transducer head for placing information on, and retrieving information from, the disk.

2. Background of the Art

The tribology of magnetic recording systems presents challenges well-known in the art. Although continual contact between the transducer (typically a read/write head mounted on a slider) and the magnetic medium is advantageous from a magnetic perspective, such arrangement is undesirable because wear and materials interactions lead to degraded system reliability and performance. Accordingly, one paramount consideration in designing magnetic recording systems is the maintenance of spacing between the head and medium.

The read/write head in a conventional recording system does not touch the rigid magnetic disk during sustained normal operation. Instead, it "flies" at a certain height (the "flying height") on a thin cushion of air carried along by the rapidly spinning disk. Typical flying heights are on the order of 12 microinches above the disk's surface.

The function of this cushion of air is analogous to that of a bearing, in that it corresponds to a machine part on which another part (the head) moves or slides with respect to the disk. In this regard, the air cushion supports the head in its position off of the disk.

Of course, a number of recording technologies do permit physical contact between head and storage medium during operation. Such technologies typically employ a flexible storage medium and are represented by tape and floppy disk recording systems. In these technologies, the concept and requirements of "flying height", and considerations relating to a bearing which functions to maintain flying height, are absent. This invention is not intended for use in such systems. Instead, this invention finds its dominant use in recording technologies in which a rigid, recording medium is moved (usually, rotated) with respect to a transducer, which must be maintained at a position off of ("above") the moving medium during system operation.

In the description following, the moving medium is assumed to be rigid, rotating magnetic disk, usually referred to as a "hard" or "Winchester" disk. However, the description of the embodiment is not intended to limit the scope of application of the invention, which could also apply, for example, to a spinning drum or, to a head in motion with respect to a stationary medium.

The disks in typical rigid-disk recording systems are commonly, but not always, coated with a relatively thin layer of lubricant, typically tens of Angstroms thick, to protect the head and disk surfaces during those occasional times when these surfaces touch, such as when the drive is jarred, or when the head passes over an asperity on the disk, or during take off and landing of the head. As is well known in the art, such lubrication is achieved by topical application.

These lubricating layers are always made with very viscous lubricants coated thinly onto the disk surfaces. This is done because less viscous lubricants would soon migrate to the edge of the disk due to centrifugal forces generated by the spinning disk and the lubricant layer would become so thin that it could no longer function effectively. Furthermore, less viscous lubricants would tend to have higher vapor pressures and tend to evaporate and further deplete the surface. If the lubricant is made thicker, then the head will be spaced further from the medium, which will degrade the performance of the system as is well known in the art.

There are several problems associated with conventional air bearings. First, air is relatively compressible. A small acceleration (as small as 40 g's) can exert a force on a head in a typical system great enough to cause the head to strike the disk, which, in spite of the presence of a lubricant, can lead to complete failure of the system. Such accelerations are easily caused by shocks and vibrations commonly encountered in the environment in which magnetic recording systems are employed. Second, when the distance from the head to the disk becomes comparable to the mean free path of air molecules, about three microinches, the air bearing becomes unstable and unreliable. As modern systems begin to approach this spacing limit, these instabilities in flying height can cause catastrophic contact between head and disk, and make it difficult for the system designer to know what record current to use when recording and what signal level to expect when reading information from the disk.

Present recording systems based upon use of a rigid disk experience the above-described shortcomings. Storage of information at even higher densities will require lower flying heights and smoother disks. Increased emphasis must, therefore, be placed on provision of a stable bearing operating between the head and the storage medium which supports the head over the medium at a distance which is smaller than that achievable by the air bearing of the prior art, yet which is mechanically simple and cost effective.

The prior art teaches the use of oil as a bearing material which can replace air. For example, Lynott's U.S. Pat. No. 2,969,435 describes an oil film spacer between a recording head and a rotating magnetic disk. In U.S. Pat. No. 3,005,675 of Ledin, et al., oil is used to form a fluid bearing between a magnetic head and a rotating drum having a magnetic recording surface. In Gabor's U.S. Pat. No. 3,579,212, a head and a storage medium are immersed in a Newtonian fluid while a related storage medium moves with respect to the head. The fluids used in these patents are Newtonian fluids which exhibit a constant viscosity. Furthermore, these references discuss head-surface spacings which are above even the spacing achievable with an air bearing. Because the described fluids are Newtonian, these prior art recording devices are relatively inefficient. This is because at very small head-surface spacings, a high speed induces a very high shear rates between the fluid and the head. As the shear rate increases, the drag force on the head increases commensurately, since the fluids are Newtonian. As the drag force increases, more power is required to rotate the disk.

In U.S. Pat. No. 4,633,351 of Bardos, et al., a hydrodynamic magnetic recording process is described in which a recording surface is moved relative to a recording head separated from the surface by a liquid of the type that will evaporate without leaving a residue. In this patent, all of the fluids proposed as evaporatible liquid bearings are Newtonian liquids, such as water, alcohol, and acetone.

In the magnetic recording arts, miniaturization of components is proceeding apace. Reduction of rigid disk standard size from 5¾" to 3½" will put a premium on techniques which increase the storage density of the small disks. Of course, one extremely effective way of increasing storage density is to decrease the flying height of the recording head. However, reduction of the flying height raises the risks in air bearing mechanisms of head-disk contact. In mechanisms which use Newtonian fluid bearings, reduction of the head-surface spacing results in a significant increase in power required to rotate the disk. In portable systems, this translates to reduction of battery lifetime or to increase in the size and count of power elements.

SUMMARY OF THE INVENTION

In view of the above deficiencies of the art, it is an object of the present invention to provide an information storage system with a novel non-Newtonian liquid bearing which supports a transducer over a relatively-moving storage medium. This object, and other purposes and advantages of the present invention are realized in an information storage system comprising a rigid information storage medium, a transducer for interacting with the information storage medium, a means for applying a force on the transducer directed toward the storage medium, and a non-Newtonian liquid bearing acting between the transducer and the storage medium to support the transducer upon the storage medium during relative movement between the transducer and the storage medium.

In this invention, the non-Newtonian liquid bearing acting between the transducer and the storage medium includes a liquid whose viscosity decreases with an increase in the shear rate to which the liquid is subjected by relative movement between the transducer and the storage medium. Such a liquid is in the class of non-Newtonian liquids described as "plastic" or "pseudoplastic".

The unique non-Newtonian liquid bearing of this invention provides manifold advantages. The plastic or pseudoplastic liquid of which the bearing consists exhibits a viscosity which decreases with an increase in the shear rate between the medium and the transducer, which is related directly to the relative velocity and indirectly to the spacing between the transducer and the storage medium. Reduction of the viscosity of pseudoplastic liquids at higher shear rates means that for any given speed, head geometry and geometrical relationship to the disk, the drag will be greater for a Newtonian liquid than for a pseudoplastic liquid if they have the same viscosity at low shear rates. In addition, use of a liquid bearing enhances the stability of the transducer with respect to the moving storage medium at high speeds and very low head-to-disk spacings. This, of course, increases the potential density of information storage on the medium and the speed with which the information can be retrieved.

BRIEF DESCRIPTION OF THE DRAWINGS

The novel features of the present invention may be better understood from the accompanying description when read in conjunction with the accompanying drawings, in which like characters refer to like parts and, in which:

FIGS. 5A–C illustrate enlarged front, bottom plan, and side views, respectively, of the head of FIG. 3;

FIG. 9 is a side, cutaway elevation view of a disk drive assembly illustrating a wet disk drive assembly environment, a spindle with a first embodiment conical bearing, and a head actuation assembly, also with a conical bearing;

FIG. 10 is the top view of an arrangement for retaining the spindle illustrated in FIG. 9 on its pivot;

FIG. 11 illustrates a side, cutaway elevation view of a wet disk drive assembly having a spindle with a second embodiment conical bearing;

FIG. 12A and 12B are schematic diagrams showing how an HDA is physically mounted and electrically interconnected in a computer, FIG. 12A illustrating the prior art, and FIG. 12B illustrating the invention; and FIG. 13 illustrates a side, cutaway elevation view of a wet disk drive assembly having a spindle with a third embodiment conical bearing.

DESCRIPTION OF THE PREFERRED EMBODIMENTS

In this description, the terms "transducer" and "head", are synonymous, as are "disk", "rigid disk", and "storage medium".

Liquid Bearing

The present invention provides a non-Newtonian liquid bearing acting between the rigid disk and head components of a head-disk assembly (HDA) used in information recording systems of the Winchester type.

Figure 1:
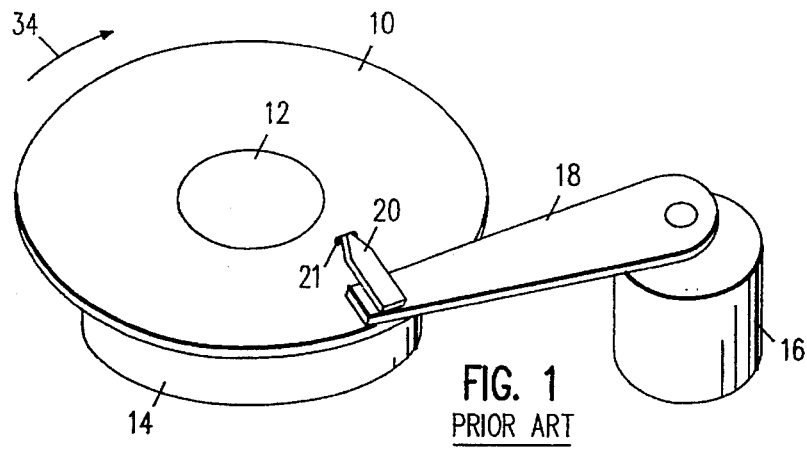
FIG. 1 illustrates a simplified diagram of a typical prior art arrangement of a head-disk assembly.
Figure 2:
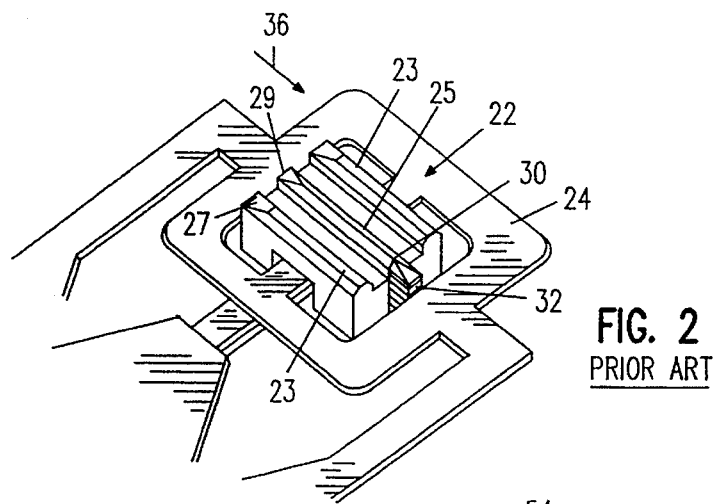
FIG. 2 illustrates an enlarged view of the underside of a typical prior art head which utilizes an air bearing interface between the head and disk.

In the prior art, illustrated in FIGS. 1 and 2, the interface between a rigid disk medium 10 and a transducer 21 is maintained in an assembly including a means for rotating the disk 10, the means including a spindle 12 which fits through a central circular hole in the middle of the disk 10, and the spindle rotator 14. The transducer 21 is normally loaded by application of a pressure or force applied to the transducer 21 and directed toward the disk 10. The force is applied by an assembly including an actuator 16, a swing arm 18, and a gimballed spring suspension mechanism 20. The actuator pivots the swing arm 18 to selectively position the transducer radially with respect to the disk 10. The gimballed spring suspension mechanism 20 loads the transducer 21 against the disk 10 when the disk is stationary. When the disk rotates, an air bearing is generated which counterloads the transducer 21, lifting and maintaining it above the surface of the disk to a distance referred to as the flying height. The spacing between the transducer 21 and the surface of the disk 10 is generally determined by the amount of loading exerted on the transducer 21, by the spring suspension, the aerodynamic design of the transducer 21 and the rotational velocity of the disk. It is to be understood that FIG. 1 is representative of the minimum complement of parts used to establish the operational interface between the transducer 21 and the disk 10. In fact, a head-disk assembly normally makes provision for a plurality of parallelly spaced, coaxial disks which rotate on a common spindle together with a ganged array of transducer heads controlled by one or more actuator assemblies.

While the disk rotates, conventional means, not shown, are used to operate the transducer 21 to electromagnetically read signals from, or write signals to, the disk. For this purpose, the transducer includes wound core with a recording gap. For an understanding of electromagnetic recording, see C. Denis Mee, et al., MAGNETIC RECORDING, McGraw-Hill, 1987.

FIG. 2 illustrates a typical prior art read/write head support structure. In the prior art, the structure in FIG. 2 includes what is commonly referred to as a "slider" 22, and the view is from the disk. The slider 22 is suspended on a gimbal 24, which allows the slider to be parallel to the disk 10 in response to forces applied to the slider in directions normal to the disk 10, while preventing lateral motion and yaw of the slider.

The slider 22 of FIG. 2 includes a pair of elongated rails 23, each with a flat bearing surface. A middle rail 25 is provided, also with a flat surface. The leading edges of the side rails 23 are beveled at 27, as is the leading edge of the center rail at 29. The transducer is mounted on the slider to place the recording gap 30 near the trailing edge of the center rail 25, while the transducer windings 32 are positioned below the recording gap on the trailing edge of the slider assembly beneath an anterior extrusion of the center rail 25. When the disk 10 rotates, a layer of air (the "air bearing") builds up at the interface between the slider of FIG. 2 and the disk 10. The built-up layer of air reverse loads the slider on the flat bearing surfaces of the rails 23, lifting the slider off of, or away from the disk 10. When the disk achieves its operational rotational velocity, the slider of FIG. 2 is borne on the counter-loading layer of air, which now functions as a bearing in supporting the slider during the relative motion between it and the disk 10. When rotation of the disk expires, the flow of air between the slider and the disk ceases, removing the counter-loading force on the slider and permitting it to contact the surface of the disk 10.

In addition to the three-rail slider shown in FIG. 2 the art also encompasses other slider configurations, some of which eliminate the center rail and place the electromagnetic transducer element in one of the two laterally spaced slider rails 23.

Reference now to FIGS. 3–5C will provide an understanding of a fundamental aspect of the invention: a bearing composed of a non-Newtonian liquid. These figures are not to scale, and certain of their features have been exaggerated for clarity.

A recording head used with the invention includes a pair of transducers mounted on a slider block carried at the end of a spring mechanism which is attached to an actuator arm 52 by a pair of through-rivets 50. The rivets attach a flexible mounting strip 54 and a spring strip 56 to the arm in a manner which exerts a spring force through spring node 57 upon the mounting strip 54 and a spring strip 56 to the arm in a manner which exerts a spring force through spring node 57 upon the mounting strip 54, which forces the mounting strip 54 toward the disk 10. A slider mechanism 60 including four slider pads 62 with flat bearing surfaces 64 is mounted at the trailing end of the mounting strip 54, suitably located underneath the spring mode 57. As illustrated in FIG. 5, a pair of bearing pads 62a and 62b is carried on each side of the slider 60. Transducer coils 67 are mounted on the rear pads 62b on each side of the slider. A recording gap is formed in at least one of the pads 62b, which carry transducer coils 67. As seen most clearly in the front and side views, FIGS. 5A and 5C, each of the front bearing pads 62a has a forward beveled surface 66.

The edges of the four pads 62 shown on the head maybe slightly rounded or "blended" as is known in the art. The ramps shown on the front pads have a slope of 0.8° and are 15 mils long. All pads are 3 mils high. The head 60 is bonded to the mounting strip with epoxy. The flexure 54 is made from 3 mil thick stainless steel. This slider has heads on only the rear of both trailing pads. Only the outside head (closest the edge of the disk) was active in data taking, and disk speed was measured with respect to this head. The speeds measured were at the center of this outside pad. The gap is not located at the trailing edge of the pad, but 6 mils behind it in the middle of a 0.7 mil wide rail of ferrite (not shown) that extends a total of 10 mils behind the trailing edge of the pad.

Figure 4:
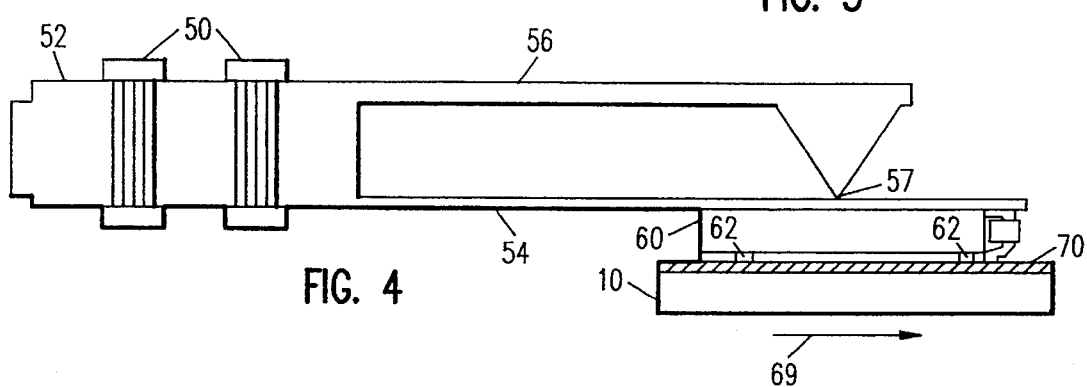
FIG. 4 illustrates a side sectional of the invention.

In FIG. 4, the disk 10 is rotated in the direction indicated by the arrow 69 to induce relative motion between itself and the slider 60. Carried on the surface of the disk 10 is a liquid 70 that forms the bearing which supports the slider in a spaced relationship with the upper surface of the disk 10. The slider 60 is loaded with a force or a pressure by the spring node 57, the force or pressure urging the slider in the direction of the disk 10. The liquid 70 is carried on the upper surface of the revolving disk 10. Directly underneath the pads of the slider 60, the liquid 70 has a thickness determined essentially by geometry of the pads, the magnitude and location of the force exerted by the spring 56, the speed of rotation of the disk 10, and the liquid's apparent viscosity. Thus, the spaced relationship exhibited by the slider 60 with respect to the disk 10 is determined by the force or pressure exerted on the slider by the spring 56 in cooperation with the counterforce exerted by the liquid bearing 70 on the slider.

Although not shown, means exist to continuously apply the liquid to the disk during its rotation. For example, a nozzle could be mounted to the slider, or by separate support, to irrigate the disk during rotation. Alternatively, the disk and slider (and associated components) could simply be immersed in the liquid during operation. A wicking arrangement for renewing the liquid bearing material is taught as follows:

Refer now to FIG. 9 in which a disk drive assembly is shown in side cutaway, and includes an outer drive case 10B having upper and lower case walls, 12B and 14B, and a central planar surface 15B positioned between the top and bottom walls to form a disk operating space 17B and a space 19B to hold the disk drive electronics (not shown).

Within the disk operating space 17B there is positioned a head-disk-actuator (HDA) assembly including a head actuation assembly 20B and a hub assembly 21B. The hub assembly 21B includes a pair of rigid magnetic disks 22B of the conventional Winchester type mounted on a spindle assembly consisting of an upper, rotatable portion 23B and a lower, stationary portion 25B.

Provision is made for rotating the upper portion 23B on the lower portion 25B by way of a brushless motor with a stator portion 27B fixed to the central planar portion 15B and rotor portion 28B fixed to the upper spindle portion 23B proximate to the stator 28B. When energized, the stator and rotor act conventionally to cause the upper portion 23B to rotate with respect to the stationary lower portion 25B. Rotation of the upper portion causes rotation of the disks 22B fixed to the upper portion. Rotation of the disks is for conventional purpose of direct access storage of computer data.

Arrayed in the disk operating space 17B of the assembly 10B is a wicking material 30B. The wicking material is attached to the interior of the casing 10B, and may entirely line the interior surface of the disk operating space 17B. Alternatively, the wicking material 30B may be attached to less than all the interior surface of the disk operating space 17B however, in the embodiment illustrated in FIG. 9, the wicking material is attached to form at least a continuous, unbroken path between the upper and center surfaces 12B and 15B. The material 30B is preferably a material which will conduct a liquid by capillary action, and thus may be, for example, a non-fibrous filter paper. In this form, the wicking material can be stamped from sheets of filter paper or the filter paper material may be formed into a preferred conductive path configuration and then glued to the interior surface of the disk operating space 17B. Alternatively, the inventors contemplate that the wicking material may be applied by a flocking process in which glue is applied to the interior surface of the disk operating space 17B in a pattern defining a liquid conducting path and a flocking material comprising loose fibers is applied to the pre-applied pattern of glue.

As illustrated in FIG. 9, the wicking material 30B includes finger extensions 31B which jut out from the wicking material 30B, parallel and adjacent to the magnetic disks 22B.

Fundamental to the invention is the provision of a liquid lubricating material in the wicking material 30B, which is continuously conducted by the wicking material's capillary action. The liquid conduction is differentially driven, in that the liquid is conducted by the material 30B from locations that are relatively wet, or saturated, to relatively dry locations. The fingers 31B provide liquid conductive paths directly to the surfaces of the magnetic disks 22B.

In operation, the wicking material 30B is initially saturated with the liquid lubricating material, causing some of the liquid to be conducted by the fingers 31B to the surfaces of the disks 22B. When the disks rotate, the liquid on the surfaces provides a bearing interface between the disk surfaces and the heads carried by the assembly 20B which exchange magnetic data with the disks. The complete description of the head-disk interface is in the previously-mentioned, commonly assigned patent application, which is incorporated herein by reference in its entirety.

As the disks achieve their intended speed of rotation, the liquid on their surfaces is moved by the centrifugal force of the disks' rotation to the edges of the disks and spun off in the equatorial planes of the disks. The wicking material forms a partial annular ring in the equatorial planes of the disks in order to efficiently collect the liquid material which is spun off. Thus, as the disks operate, the concentration of liquid in the material locations 33B which coincide with the equatorial planes of the disks 22B will become relatively great, with the liquid being conducted by capillary action of the material 30B away from those locations. As the liquid is transferred from the fingers 31B to the surfaces of the disks, the fingers will become relatively dry with respect to the locations 33B, with the result that the liquid will be conducted from these locations, out through the fingers, and back to the surfaces of the disks.

It should be evident that as the liquid is recirculated from the surfaces of the disks 22B through the wicking material 30B and back to the surfaces, that contaminating particles will be carried by the liquid into the material and trapped in the equatorial planes of the disks 22B.

The continuous recirculation of the liquid lubricating material within the wicking material 30B provides the opportunity for use of an open frustoconical bearing composed of the upper and lower bearing portions 23B and 25B. As illustrated, the upper bearing portion 23B forms the rotatable portion of the HDA spindle. As illustrated in FIG. 9, the upper portion 23B is formed from a porous ceramic material which can conduct the lubricating material by capillary action. The upper portion 23B includes a concave, frusto-conical bearing surface 40B. In FIG. 9, the second portion 25B has a first, annular pivot portion 41B formed from a hard, bearing-grade material such as stainless steel.

The choice of materials for the upper and lower spindle portions can differ from that illustrated. For example, both upper and lower portions can be made from non-porous, bearing-grade material, such as stainless steel.

The pivot portion 41B has a convex frusto-conical bearing surface 42B which is shaped to fit closely to and join the concave bearing surface 40B. The pivot portion 41B is fastened to the central planar surface 15B by means of four pads, two illustrated by 44B, each of which is attached to an extension 47B of the surface 15B. The four pads 44B and the annular configuration of pivot portion 41B accommodate an upward extension 50B of the wicking material 30B. The upper extension 50B contacts the surface 40aB of the upper bearing portion, which transitions to the conical portion 40B. The stator assembly 27B is mounted on eight sandoffs, four indicated by 51B, to allow the wicking material to form a continuous path from wicking material 30B to the upward extension 50B. since the upward extension 50B is continuous with the wicking material 30B and therefore forms a conductive path from the wicking portions 33B, through the interior of the lower bearing portion 25B, to the surface 40aB. Through this path, the bearing interface is lubricated during operation.

To complete the description of the frusto-conical spindle bearing in the HDA of FIG. 9, the upper, rotating bearing portion 23B is rotatably joined with the stationary portion 25B by means of a thrust washer assembly 60B, illustrated in FIGS. 9 and 10. The thrust washer assembly includes a metallic, cross-shaped thrust washer 61B, of the Bellevue type, for example, to each extension of which is attached a porous ceramic pad (or stainless steel) 63B. The washer 61B is retained against, or fastened to the upper surface 12B of the drive case 10B. The Bellevue washer 61B and attached pads act between the upper wall 12B and the upper surface 65B of the bearing upper portion 23B. The washer mechanism 60B provides a high thrust force directed along the axis of the spindle bearing to retain the upper portion 23B in rotatable engagement with the lower bearing portion 25B.

As illustrated in FIGS. 9 and 10, the wicking material 30B extends down through the washer assembly 60B to contact the upper surface 65B of the bearing upper portion 23B. This provides conductive path for the liquid lubricant from the wicking material 30B to the interface between the pads 63B and the top surface of the upper spindle portion 23B.

As the upper spindle portion 23B is rotated by the brushless motor, the bearing interface is lubricated by conduction of liquid lubricant through the extension 50B to the surface 40aB. The centrifugal force of rotation of the bearing forces the liquid lubricant outwardly on the surface 40aB, and then downwardly along the conical interface between surfaces 40B and 42B, and out through the bottom of the interface at 70B, where it reenters the wicking material 30B. The flow of the lubricating material to the conical bearing interface through the extension 50B can be enhanced by an ancillary pump which will increase the liquid pressure at the bearing interface; spiral etching of one or the other of the bearing surfaces 40B and 42B, will also encourage movement of the liquid lubricant along the interface.

It is to be observed that the exhaustion of lubricant from the conical bearing at 70B protects the surface of the disks 27B from debris originating in the bearing. All such contamination is trapped in the wicking material beneath 70B and filtered out of the lubricant before it reaches the disk.

The conical bearing provides an improved performance with respect to the prior art spindle bearings. As discussed above, the rolling bearings of the prior art spindles, based upon ball- or roller-bearings, constitute one of the primary failure mechanisms of prior art spindles. Further, the following bearings of the prior art spindles cause non-repeatable run-out (NRRO) dependent upon the axial load of the bearings. As is known, NRRO degrades disk performance by shifting a disk track with respect to the head currently reading or writing the track. In contrast, the conical bearing of the invention provides a spindle bearing with non-rolling parts that operates to axially and radially align the bearing portions without NRRO. Use of the conical bearing of FIG. 9 in prior art disk drives is unobvious because such bearings tend to pump the lubricant out of the bearing interface due to centrifugal action. As all of the prior art disk drive assemblies are "dry," they require bearing designs which integrate and maintain the bearing lubricant within the bearing assembly. This leads, naturally, to the use of rolling-type bearing assemblies which can be manufactured and assembled into the prior art disk drive spindles in a closed form retaining the lubricant within the bearing. However, the opening of the disk operating space environment to the free flow of a liquid lubricant frees the prior art disk drive spindle design from the need to retain lubricant within the spindle bearings, thus, giving birth to the possibility of the conical bearing included in this invention.

As FIG. 9 illustrates, the head actuator assembly 20B of the HDA also incorporates an open conical bearing in which a moveable pivoting portion 80B has a lower frusto-conical concavity which interfaces with a convex frusto-conical surface of a lower, stationary pivot. The stationary pivot 81B is fastened to the surface 15B by four lower extensions 82B. The pivot 81B is annular and has a central opening through which an extension 83B of the wicking material rises to conduct the liquid lubricant which lubricates the conical interface. The rotating portion 80B is held in rotatable conjunction with the pivot 81B by a Bellevue washer assembly 84B, which is fastened to the top casing wall 12B. The Bellevue washer assembly 84B permits an extension 86B of the wicking material to lubricate the top surface of the rotating spindle portion 80B.

Refer now to FIG. 11 in which a second embodiment of a conical spindle bearing for a disk-drive assembly 100B is shown in side cutaway. The assembly 100B includes an outer drive case 110B having upper and lower case walls 112B and 114B in which a rigid magnetic disk 116B of the Winchester type is mounted for rotation. The outer case 110B encloses an interior disk operating space 118B forming a closed environment within which the disk 116B rotates for conventional magnetic storage of computer data. The interior surface of the case 110B is lined with a porous wicking material 120B. It is asserted that the wicking material 120B is saturated with a liquid lubricant material which is recirculated by means discussed above. The lubricating material is applied to the surface of the disk 116B and, when the disk 116B rotates during operation, is thrown off of the disk in the disk's equatorial plane back to the wicking material 120B.

When the disk 116B spins, the portion of the wicking material 120B which is in the equatorial plane of the disk 116B becomes saturated with liquid lubricating material, which the excess liquid lubricating material being conducted by capillary action throughout the wicking material, and returned to the bearing interface from the wicking material.

As illustrated, the spindle assembly 130B which supports the disk 116B for rotation includes a rotatable upper bearing portion 132B having a generally conical interior interface surface 135B which receives the upper conical bearing surface 136B of a stationary steel pivot 137B. The steel pivot 137B is mounted on the bottom wall 114B of the case 110B, while the upper bearing portion 132B is held against the pivot 137 for rotation thereupon at the conical interface means of a thrust bearing 140B retained axially against the upper bearing portion 132B by a spring clip 142B. The spring clip 142B is conventionally retained against or fastened to the upper case wall 112B, where it acts between the thrust bearing 140B and the wall to exert a force against the upper bearing portion 132B, thrusting it axially against the stationary pivot 137B. As shown, the thrust bearing 140B has a central opening through which an extension 141B of the wicking material 120B extends.

The upper bearing portion 132B is manufactured of the porous ceramic material mentioned above, which conducts the liquid lubricating material by capillary action from the extension 141B down to the conical bearing interface between the surfaces 135B and 136B. The stationary pivot 137B is manufactured of stainless steel and is fixed to the bottom casing wall 114B.

Alternatively, the pivot 137B can be made of the porous ceramic material, and the upper bearing portion 132B of stainless steel. In this case, the conical bearing interface would be lubricated by conduction of liquid lubricant from wicking material on the lower case wall 114B through the porous ceramic material of the stationary pivot.

The upper bearing portion 132B is rotated on the pivot 137B by a brushless motor including a stator 145B fixed to the bottom casing wall 114B by standoffs 146B and a rotor 147B mounted against a lower annular lip 148B of the upper bearing portion 132B. The standoffs provide a continuous wicking path for the wicking material 120B to conduct liquid and lubricant to or from the pivot 137B.

The means of returning the liquid lubricating material to the surface of the disk 116B and the material extension 140B includes the means and procedures described above in connection with FIG. 9.

Figure 12B:
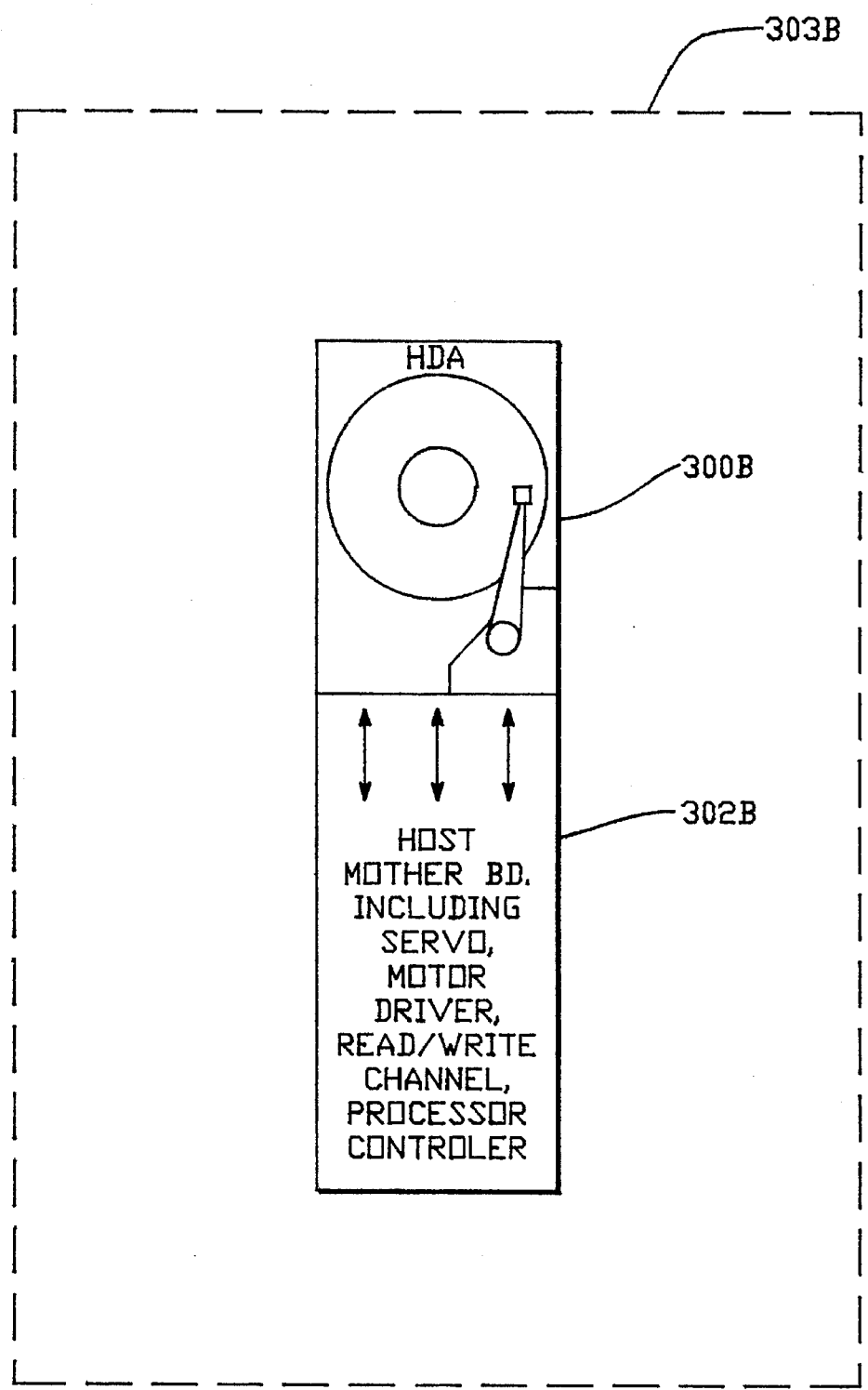

A signal advantage of the wet disk drive assembly which includes a conical spindle bearing is illustrated in FIGS. 12A and 12B. In FIG. 12A, the conventional prior art mode of mounting a disk drive unit in a computer is illustrated. In FIG. 12A, a disk drive assembly 200B, comprising a self-contained unit which is mounted to the chassis of a computer 198B includes an HDA 210B, an interfacing motor driver 211B, a read/write channel 212B, a head actuator servo 214B, and microprocessor/controller 216B. The motor driver 211B is connected to drive the brushless electric motor which rotates the spindle and attached disk in the HDA 212B as described above. The read/write channel 212B comprises one or more bi-directional, coded data channels, represented by the signal line 213B, each operating through a respective one of the heads mounted on the head actuator assembly 211B of the HDA. The channel 212B operates conventionally in conjunction with a servo 214B which positions the read/write heads in the HDA as required for storing or retrieving coded data. The microprocessor/controller 216B operates as a control "plug" through which the servo 214B and the motor driver 211B are operated. The processor/controller 216B provides information to the channel 212B indicating when, and where, a head has been positioned in the HDA for reading or writing. A "host" motor board forms the primary data interface with the channel 212B and the primary control interface with the processor/controller 216B.

In the conventional arrangement of FIG. 12A, the disk drive assembly 200B is permanently mounted within the computer 198B by means of a frame with a shock mounting suspension 230B, which is provided to mechanically isolate the disk drive 200B from the computer 198B, thereby protecting it from the effects of the mechanical environment within which the computer 198B is operated. Typically, the mother board 220B is a printed circuit board which is mounted in the computer 198B. The mother board incudes a backplane and a number of pluggable interfaces into which circuit card nodules can be inserted. The data and control signal interfaces between the mother board 220B and the disk drive 200 are symbolized by data paths 231B and 232B, respectively, which usually comprise wire bundles connected to the mother board 220B.

With the wet environment illustrated above permitting the use of a liquid bearing to support "flight" of a magnetic head with respect to ar rotating disk, and an open conical bearing for the spindle and actuator assemblies in the disk drive assembly, the HDA of a disk drive assembly can be mounted directly onto a mother board by conventional rigid or pluggable mounting means. The liquid head-disk bearing and the open conical bearings of the spindle and head actuator provide a high resistance to shock and vibration, thereby eliminating the need for shock mounting or other mechanical suspension of the HDA. Thus, as illustrated in FIG. 12B, the HDA 300B of a disk drive assembly can be mounted directly to a host mother board 302B. This eliminates the need for a frame and suspension for mounting the assembly, as well as precautionary steps required for manufacture and assembly. It is asserted that with the configuration of FIG. 12B, the mother board 302B can carry all of the electronics necessary to operate the HDA 300B including the head actuator servo, a motor drive, read/write channel, and a micro-processor/controller. The routineer will appreciate that this eliminates the necessity for cable interconnection between the disk drive assembly and host mother board. Instead, the interfaces previously served by cables can be integrated into the backplane of the mother board.

Refer now to FIG. 13 for third embodiment of a conical bearing to be used in the spindle mechanism of a upper and lower axial conical bearings. This spindle assembly is indicated generally by 400B and carries a pair of rigid magnetic disks 402B. The rotatable portion of the spindle includes a stainless steel axle 403B having upper and lower frusto conical surfaces 407B and 408B. Upper and lower hubs 410B and 412B are complementarily mounted on the upper and lower walls 410aB and 412aB of an interior casing held within an outer casing 411B. These hubs are formed from a porous material which conducts the liquid lubricant; such a material can include the porous ceramic material referred to above or to a conventional sintered porous bronze material from which oil-lite bearings are made. The hubs 410B and 412B have a frusto conical surface 414B and 416B, respectively. A stator 420B and a rotor 421B provide a rotating force for the axle 403 when the stator 420B is energized. As is known, the porous material of which the upper and lower hubs 410B and 412B are formed will conduct the liquid lubricant described above to the bearings interfaces. The lubricant is delivered to the hubs through the wicking material 430B which lines the interior of the disk drive assembly case 432B. The wicking material includes finger 435B for lubricant the disks 402B. Although not shown, the stator 420B is discontinuous and provides a path by which the material 430B contacts the lower hub 412B.

Relative to the gas bearing formed by air in the prior art recording systems, the liquid bearing 70 of FIG. 4 is non-compressible, thereby providing a very "stiff" bearing which stabilizes the slider with respect to the disk at head-to-disk spacings beneath the flying heights achievable with the prior art air bearing. Indeed, with an empirically selected combination of spring pressure, liquid viscosity, and disk speed, the thickness of the liquid bearing can be less than the mean free path of air molecules, the lower flying height limit of the air bearing in the prior art.

The viscosity of the liquid 70 (relative to air) also substantially increases the damping exhibited by the bearing, when compared to the damping evidenced by the air bearing. This tends to suppress or reduce oscillations of the slider which are perpendicular or parallel to the disk. As is known, perpendicular oscillations can cause the slider to strike the disk; parallel oscillations cause loss of track or phase errors in data being read or recorded, and affects settling time when the head is actuated from one track to another.

It is asserted that the inventive combination illustrated in FIG. 4 should not be limited to the particular slider configuration there illustrated. The inventors have also successfully employed the slider configuration illustrated in FIG. 2 in combination with the liquid bearing 70 to achieve a performance similar to that evidenced by the slider of FIGS. 3 and 5.

Figure 6:
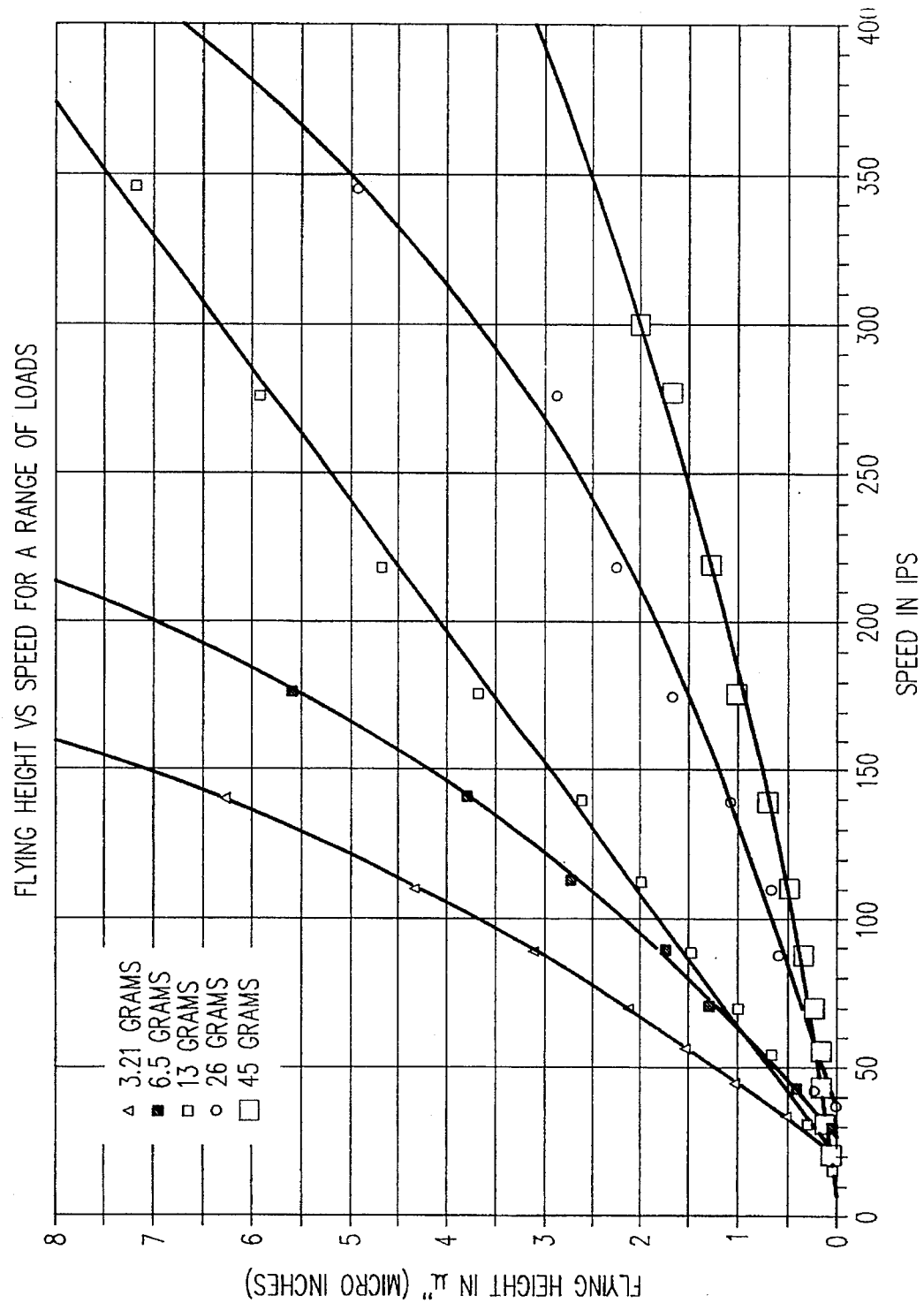
FIG. 6 is a graph which illustrates head-to-disk spacings achievable with this invention.

The performance of the inventive combination illustrated in FIG. 4 with the slider of FIGS. 3–5C is given in FIG. 6. FIG. 6 is derived from the data in Table I. FIG. 6 illustrates the head-to-disk spacing of the head as a function of speed in inches pre second (ips) for various loading forces. The liquid used was GALDEN D02, made by Montefluous of Milan, Italy. "GALDEN" is a registered trademark of Montefluous.

Figure 3:
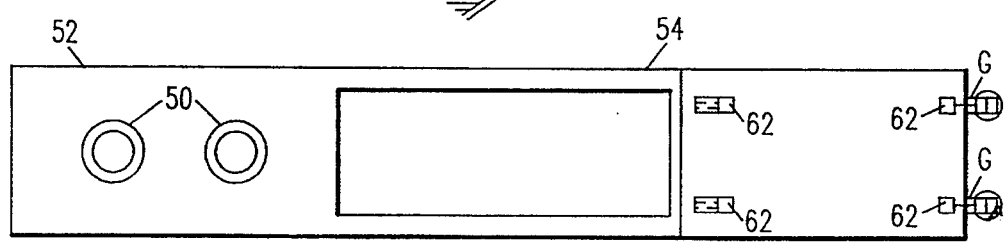
FIG. 3 illustrates an underside view of one embodiment of an improved head used with the present invention.

According to principles well-known in the art, electrical measurement of the voltages generated by the head of FIGS. 3 and 4 during playback under the various combinations of speed and load illustrated in Table I and FIG. 6 were used to infer the relative head-to-disk spacings of the head. The absolute head-to-disk spacings of this head were then measured by observing interference patterns of the surface of the slider while operating the slider above a glass disk under similar combinations of speed and load. FIG. 6 represents the inventors' best estimate of the flying height based on a comparison of the electrical and optical measurements. The head-to-disk spacings illustrated were further corroborated by noting that, as would be expected, they tend to converge on zero microinches as the speed approaches zero.

As stated above, the liquid used to form the bearing between the slider and disk is a non-Newtonian liquid. Under conditions encountered in the HDA operation of FIG. 4, the liquid is subjected to a very high shear rate at which its viscosity is highly non-linear. This provides a low-power interface at head-to-disk spacings that are significantly beneath the flying heights achievable in the prior art. Viscosity is defined as the proportionality constant between shear stress (F/A) and the velocity gradient. This relationship is symbolized by equation (1), wherein:

$$F/A = u\, dv/dy \qquad (1)$$

Figure 7:
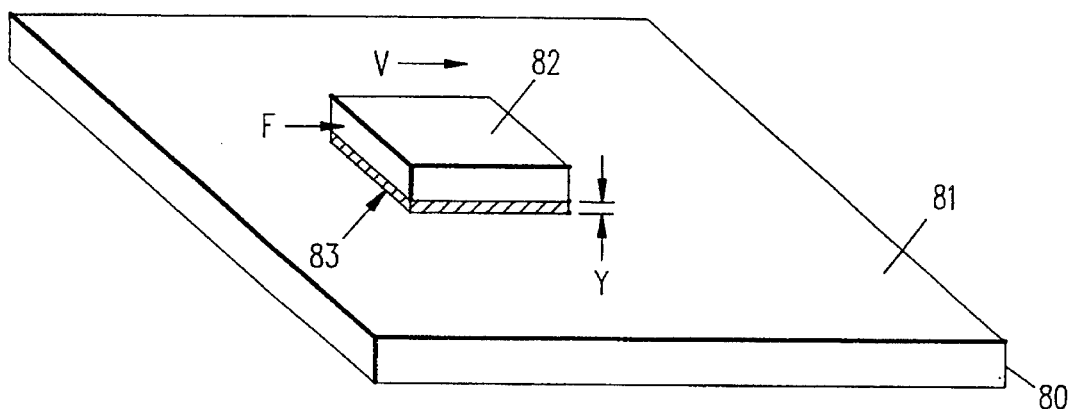
FIG. 7 provides a schematic illustration demonstrating parameters descriptive of a non-Newtonian liquid bearing.
Figure 8:
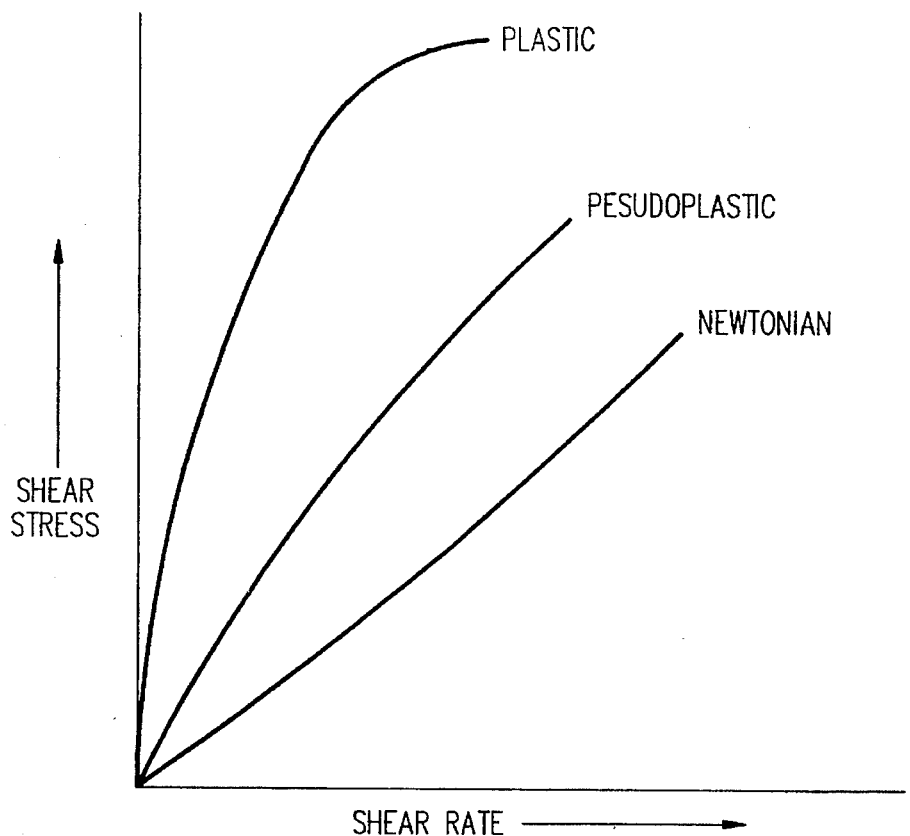
FIG. 8 is a set of curves demonstrating apparent viscosity of Newtonian fluids as compared with apparent viscosity of plastic of pseudoplastic fluids.

With reference to FIG. 7, and equation (1), F is the force exerted on a stationary plate 80 having an upper face 81 with an area A by a parallel plate 82 moving at a velocity v and spaced from the face 81 to a distance (i.e., head-to-disk spacing) y by a liquid 83 of viscosity u. For small y, the share rate dv/dy is linear with y, and is v/y. When u is a constant, the liquid is said to be Newtonian, and the classical equation of hydrodynamics, the Navier-Stokes equation, is valid. The Navier-Stokes equation is not valid for any fluid that departs from constant u; in particular, the equation is not valid for fluids that depart so far from the constant as to be called "pseudoplastic" or "plastic". FIG. 8 illustrates the relationship of Newtonian and pseudoplastic and plastic liquids.

For definition and explanation of non-Newtonian fluid flow, reference is made to the CHEMICAL ENGINEER'S HANDBOOK, Fifth Edition, Robert H. Perry, et al., Editors, 1973, at pp. 5–38 through 5–40.

FIG. 8 illustrates the shear stress of a liquid as a function of time rate of deformation of the liquid (shear rate). As will be appreciated by those skilled in the art, when the arrangement of FIG. 7 is used to induce shear stress in the liquid 83, the time rate of deformation is directly related to the velocity, v. In FIG. 8, the shape of each curve directly represents the change in viscosity of the liquid. The curve labeled "Newtonian" shows a constant viscosity of a value corresponding to the slope of the curve. The curves labeled "pseudoplastic" and "plastic" indicate liquids whose viscosity apparently decreases with an increase in shear rate.

The degree to which the viscosity of a plastic or pseudoplastic liquid departs from a constant value under the drive conditions encountered by the liquid bearing of FIG. 4, for example, was quantified by the inventors by measuring the drag force on a head-to-disk spacing of two microinches ($5\times10^{-6}$ cm) and at a speed of 235 inches per second (597 cm/sec) and comparing that force with the drag force at low shear rate where the liquid has a relatively constant viscosity. The plastic or pseudoplastic nature of the liquid bearing is important to our invention since it allows very small power dissipation in the head-disk interface at the speeds and small spacings necessary for a very high density of information storage on the disk. In this regard, the power dissipated at the interface between the head and disk is given by equation (2), wherein:

$$p = Fv \qquad (2)$$

From equations (1) and (2), it is possible to calculate the drag force on a head, and the power dissipated in rotating a disk when the liquid bearing material is a Newtonian fluid. In an experiment conducted to measure non-linearity of share stress, a liquid with a viscosity at a lower shear rate of 1.8 centistokes was used. The velocity at high shear rate was 597 cm/sec and the head-disk spacing was $5\times10^{-6}$ cm. A four-pad head, similar to the head illustrated in FIGS. 5A, 5B, and 5C was used, with the area of each pad being $8\times10^{-3}$ cm$^{-2}$. The drag force on the head and the power dissipated in shearing liquid under these conditions, assuming the fluid to be Newtonian, would be:

$$F = Auv/y = 1.69\times10^{-4} \text{ dynes}$$

and $$P = Fv = 1\times10^{7} \text{ dyne cm/sec} = 1.0 \text{ watts}.$$

The actual force and power measured where $0.13\times10^{4}$ dynes and 0,078 watts. In comparing this value with the 1.0 watt value calculated for the Newtonian fluid, it is evident that the force and power necessary for a non-Newtonian plastic or pseudoplastic liquid are over an order of magnitude less than required with a Newtonian liquid. This departure from linearity is due to the non-Newtonian nature of the liquid used, and is so large that the liquid falls under the definition of plastic. Thus, the plastic liquid has been forced into a state where its dynamical viscosity is about 1/10 that of water, which unexpectedly results in the very low power required to rotate a disk when a recording head is supported by the liquid at a very low spacing with respect to the disk.

The measurement of force and power in the experiment described above was made using the GALDEN D02 liquid described above, which is in a family of perfluorinated liquids produced by Montefluos. The general chemical structure and characteristics of these liquids are known. Another liquid exhibiting properties of the curve labeled "plastic" in FIG. 8 is any one of a series of fluorinated oils produced by DuPont and sold under the trademark "KRYTOX". These materials are described as low molecular weight, fluorine end-capped, homopolymers of hexafluoropropylene epoxide with known chemical structure. These liquids are sometimes referred to as PFAE or PFPE oils. Generally, these materials can also be termed "liquid fluorocarbons".

At the very high shear rates experienced between the liquid bearing of this invention and a slider, the liquid becomes ordered in the sense that its molecules become aligned in the direction of shear, with the viscosity of liquid dropping in the direction of shear. This results in very little power loss in the interface with the concomitant advantage of requiring relatively low head loading force to achieve a desired head-to-disk spacing. At the same time, the viscosity perpendicular to the shear in the plane of the head-liquid bearing interface goes up, preventing leakage of the liquid out the sides of the head pads and an associated loss of head pressure that supports the head in its spaced relationship with respect to the disk. The result is that very narrow head pads can be used, thereby further lowering head drag for a given head-to-disk spacing.

A further advantage lies in the relative insensitivity of the spacing of a head from a disk as a function of head-disk velocity. In this regard, prior art disk drives suffer from flying heights that vary with the radial position of the head with respect to the center of the disk. In the prior art, this drawback is accommodated by limiting recording density to the worst case, that is, the highest flying height. In our invention, since spacing is related to viscosity and velocity as $G(uv)^{0.5}$ and since $u=f(1/v)$, viscosity and velocity tend to compensate; in fact, if the slope of the non-Newtonian viscosity curve is selected properly, the two parameters of viscosity and velocity can effectively cancel each other, resulting in constant head-to-disk spacing independent of radial location of the head.

TABLE I

HEAD-TO-DISK SPACING (IN MICROINCHES)
VERSUS SPEED FOR VARIOUS LOADS
USING NON-NEWTONIAN LIQUID BEARING

| SPEED ips | FH @ 3.21 gr | FH @ 6.5 gr | FH @ 26 gr | FH @ 13 gr | FH2 45 gr |
|---|---|---|---|---|---|
| 347 | | | 4.9 | 7.3 | 2.0 |
| 276 | | | 2.9 | 5.9 | 1.6 |
| 219 | | | 2.3 | 4.6 | 1.3 |
| 174 | | 5.6 | 1.6 | 3.6 | 1.0 |
| 138 | 6.3 | 3.8 | 1.1 | 2.6 | 0.7 |
| 110 | 4.3 | 2.7 | 0.7 | 2.0 | 0.6 |
| 87 | 3.1 | 1.8 | 0.6 | 1.5 | 0.4 |
| 69 | 2.1 | 1.3 | 0.3 | 1.0 | 0.3 |
| 55 | 1.5 | 0.8 | 0.3 | 0.8 | 0.3 |
| 43 | 1.0 | 0.5 | 0.2 | 0.6 | 0.2 |
| 35 | 0.5 | 0.2 | | 0.3 | 0.2 |
| 28 | 0.3 | | | 0.3 | 0.1 |
| 22 | | | | 0.2 | |

While we have described several preferred embodiments of our liquid bearing, it should be understood that modifications and adaptations thereof will occur to persons skilled in the art. Therefore, the protection afforded our invention should only be limited in accordance with the scope of the following claims.

We claim:

1. An information storage system comprising:

a substantially rigid rotatable storage medium having a magnetic data surface;

means for rotating the rotatable storage medium;

a magnetic transducer means;

means for maintaining a film of a non-Newtonian fluid on the magnetic data surface by applying the fluid to the magnetic data surface during rotation of the storage medium, the magnetic transducer means being supported adjacent to the magnetic data surface during rotation of the storage medium, by the film of the fluid.

2. An information storage system as claimed in claim 1 wherein the rotatable storage medium is a rigid magnetic disk.

3. An information storage system as claimed in claim 1 wherein the means for maintaining applies the fluid continuously to the magnetic data surface.

4. An information storage system as claimed in claim 1 wherein the means for maintaining comprises a nozzle.

5. An information storage system as claimed in claim 1 wherein the means for maintaining comprises a wicking material.

6. An information storage system as claimed in claim 1 wherein the non-Newtonian fluid is a pseudoplastic fluid.

7. An information storage system as claimed in claim 1 wherein the non-Newtonian fluid is a plastic fluid.

8. An information storage system as claimed in claim 1 wherein the magnetic transducer means can be positioned at least a first radial position relative to the center of the rigid magnetic disk and a second radial position relative to the center of the rigid magnetic disk, and wherein the non-Newtonian fluid has an apparent viscosity which decreases with an increase in a shear rate to which the non-Newtonian fluid is subjected, the shear rate being determined by v/y where v is the velocity of the rigid magnetic disk with respect to the magnetic transducer means and y is the distance between the magnetic transducer means and the magnetic data surface, the apparent viscosity of the non-Newtonian fluid being inversely proportional to velocity of the rotatable storage medium with respect to the magnetic transducer means, and such that the distance between the magnetic transducer means and the magnetic data surface when the magnetic transducer means is at the first radial position is approximately equal to the distance between the magnetic transducer means and the magnetic data surface when the magnetic transducer means is at the second radial position.

9. An information storage system as claimed in claim 1 wherein the rigid magnetic disk rotates at a specified angular velocity and the magnetic transducer means is positioned at a selected one of a plurality of radial positions relative to the center of the rigid magnetic disk, and wherein the non-Newtonian fluid has an apparent viscosity which decreases with an increase in a shear rate to which the non-Newtonian fluid is subjected, the shear rate being determined by v/y where v is the velocity of the rigid magnetic disk with respect to the magnetic transducer means and y is the distance between the magnetic transducer means and the magnetic data surface, the apparent viscosity of the non-Newtonian fluid being inversely proportional to velocity of the rotatable storage medium with respect to the magnetic transducer means, and such that the distance between the magnetic transducer means and the magnetic data surface is relatively independent of the selected one of the plurality of radial positions relative to the center of the rigid magnetic disk for the specified angular velocity.

10. An information storage system as claimed in claim 1 wherein the means for rotating rotates the storage medium at greater than 150 ips.

11. An information storage system as claimed in claim 1, wherein the magnetic transducer is supported adjacent to the magnetic data surface by the film of the fluid at all times when the storage medium is rotating.

12. An information storage system comprising:

a substantially rigid rotatable storage medium having a magnetic data surface;

means for rotating the rotatable storage medium;

a magnetic transducer means; and a non-Newtonian fluid;

wherein the rotatable storage medium and the magnetic transducer means are immersed in the non-Newtonian fluid.

13. An information storage system as claimed in claim 12 wherein the non-Newtonian fluid is a pseudoplastic fluid.

14. An information storage system as claimed in claim 12 wherein the non-Newtonian fluid is a plastic fluid.

15. An information storage system as claimed in claim 12 wherein the means for rotating rotates the storage medium at greater than 150 ips.

16. An information storage system comprising:

a substantially rigid rotatable storage medium having a magnetic data surface mounted on a spindle;

a spindle rotator for rotating the spindle and mounted rotatable storage medium;

a transducer;

wicking material for maintaining a film of a non-Newtonian fluid on the magnetic data surface by applying the non-Newtonian fluid to the magnetic data surface during rotation of the storage medium, the magnetic transducer being supported adjacent to the magnetic data surface during rotation of the storage medium, by the film of the non-Newtonian fluid.

17. An information storage system as claimed in claim 16 wherein the non-Newtonian fluid is a pseudoplastic fluid.

18. An information storage system as claimed in claim 16 wherein the non-Newtonian fluid is a plastic fluid.

19. An information storage system as claimed in claim 16 wherein the spindle rotator rotates the storage medium at greater than 150 ips.

20. An information storage system as claimed in claim 16 wherein the magnetic transducer is supported adjacent to the magnetic data surface by the film of the fluid at all times when the storage medium is rotating.

* * * * *